(12) United States Patent
Martin et al.

(10) Patent No.: US 7,285,172 B2
(45) Date of Patent: Oct. 23, 2007

(54) METHOD FOR REMOVAL OF PARTICULATE MATTER

(76) Inventors: William R. Martin, 117 Muskhogean Rd., Fair Play, SC (US) 29643; Carl W. Martin, 67 Brittany Ct., Jefferson, GA (US) 30549

( * ) Notice: Subject to any disclaimer, the term of this patent is extended or adjusted under 35 U.S.C. 154(b) by 0 days.

(21) Appl. No.: 11/301,156

(22) Filed: Dec. 8, 2005

(65) Prior Publication Data

US 2006/0260650 A1 Nov. 23, 2006

Related U.S. Application Data

(63) Continuation-in-part of application No. 11/135,051, filed on May 23, 2005.

(51) Int. Cl.
 *B08B 7/04* (2006.01)

(52) U.S. Cl. ............................................. 134/42; 134/4

(58) Field of Classification Search ...................... 134/4, 134/42
See application file for complete search history.

(56) References Cited

U.S. PATENT DOCUMENTS

| | | | |
|---|---|---|---|
| 4,097,395 A | 6/1978 | Posey et al. | |
| 4,380,459 A * | 4/1983 | Netting | ........................ 95/150 |
| 4,561,905 A * | 12/1985 | Kittle | ........................ 134/25.1 |
| 4,693,755 A | 9/1987 | Erzinger | |
| 4,857,085 A | 8/1989 | Egri, II | |
| 5,439,322 A | 8/1995 | Barnett | |
| 5,516,973 A | 5/1996 | Mirick et al. | |
| 5,743,841 A | 4/1998 | Block et al. | |
| 5,783,550 A | 7/1998 | Kuriyama et al. | |
| 6,589,156 B2 | 7/2003 | Kindt | |
| 6,939,937 B2 | 9/2005 | Markham et al. | |

FOREIGN PATENT DOCUMENTS

| | | | |
|---|---|---|---|
| EP | 0210066 | * | 1/1987 |
| GB | 2268902 | * | 1/1994 |
| JP | 08-120953 | * | 5/1996 |

OTHER PUBLICATIONS

University of Cincinnati University Health Services 556-4968, Environmental Health and Safety, Advisory No. 3.8, *Drilling Into Solid Asbestos Containing Material Abatement Program Plan*, 1 pg.

* cited by examiner

*Primary Examiner*—Zeinab El-Arini
(74) *Attorney, Agent, or Firm*—John B Hardaway, III; Nexsen Pruet LLC

(57) ABSTRACT

An improved process for removal of particulate matter having airborne potential. The process includes applying a foam to the particulate matter in a particulate matter area to prevent the particulate matter from becoming airborne. The particulate matter area may then be removed, prior to the foam draining, and encased in a storage device.

3 Claims, 3 Drawing Sheets

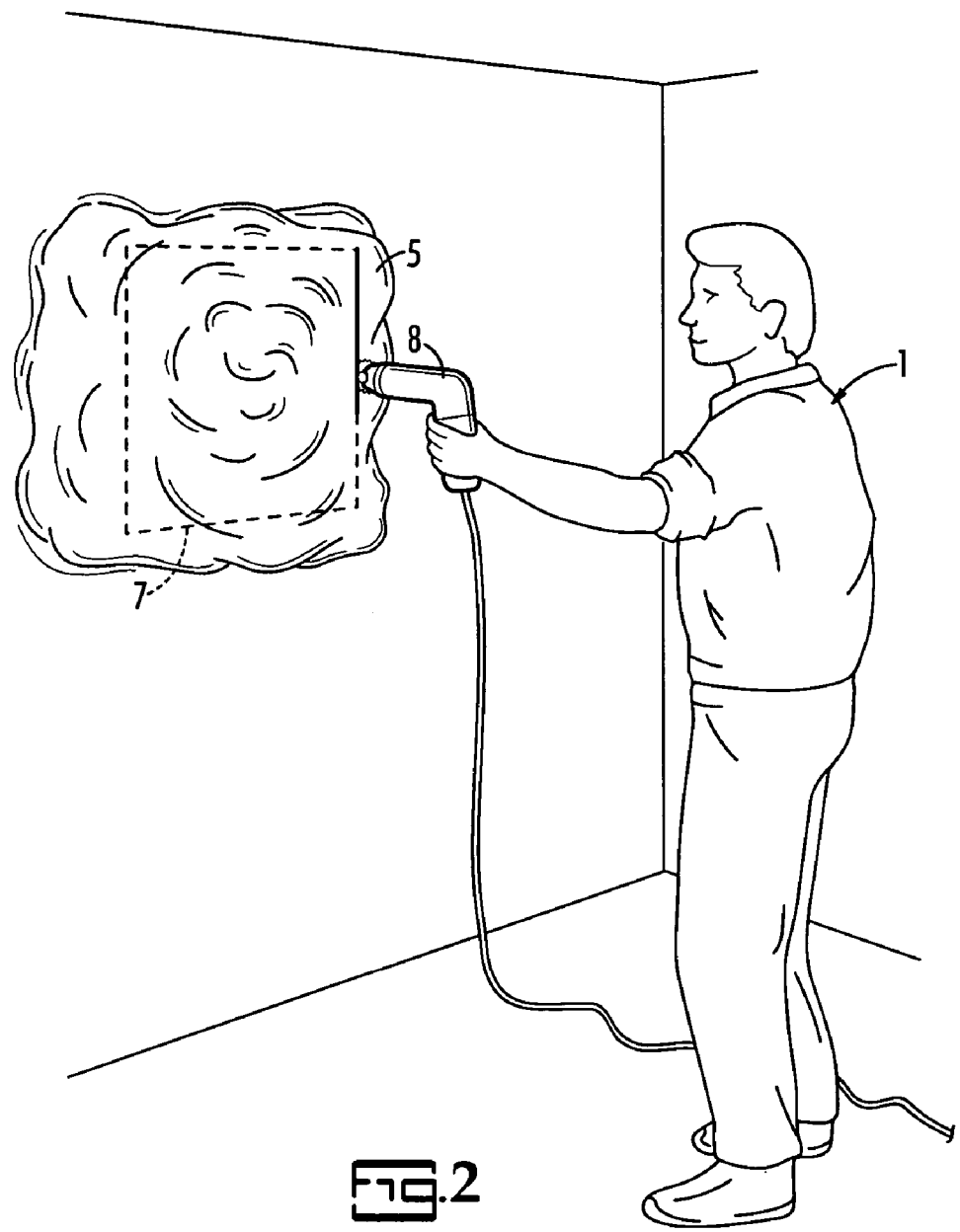

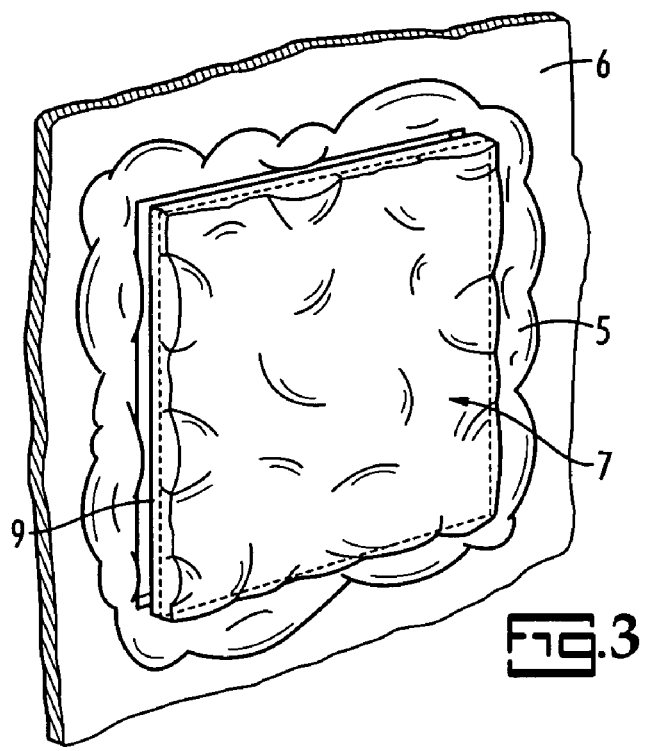
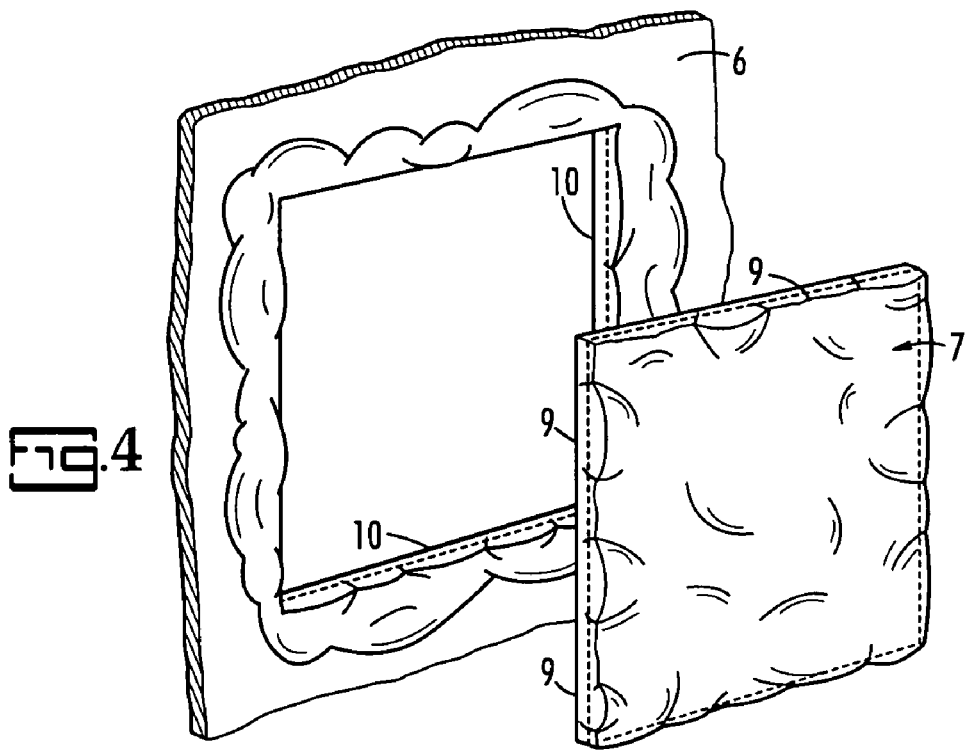

METHOD FOR REMOVAL OF PARTICULATE MATTER

CROSS-REFERENCE TO RELATED APPLICATIONS

The present application is a continuation in part application of U.S. patent application Ser. No. 11/135,051 filed May 23, 2005 which is pending.

BACKGROUND

The present invention is related to an improved process for removal of particulate matter having airborne potential. More particularly, the present invention is related to the application of non-reactive foam to particulate matter for removal wherein the adhesive readily adheres to the particulate matter and prohibits dislodged particles from becoming airborne.

The removal of materials from areas such as houses, buildings, and construction sites is often dangerous. If the material contains particulate matter, or particulate matter is near the material being removed, the particulate matter may become airborne. If the particulate matter is airborne, it may be inhaled by the material remover or anyone located near the removal site and become lodged in that person's nose, eyes, throat or lungs. Particulate matter is often defined as a small discrete mass of solid or liquid matter which may become airborne. Examples of particulate matter include mold spores and asbestos particles.

The presence of mold can create extremely hazardous conditions. Mold is typically a fungus that produces a superficial growth on various kinds of damp or decaying organic matter. Common molds include Aspergillus, Stachybotrys, Cladosporium, Fusarium, Penicillium, and Mycotoxins. These species of molds maintain varying health effects on humans, and any excessive mold growth can lead to increased allergies, toxicity, and house/building structural problems.

When mold is present, it is comprised of tiny spores of particulate matter which reproduce. These tiny spores waft through the air upon the smallest amount of movement, and when the mold spores land on damp spots, these mold spores begin growing and digesting whatever they are growing on in order to survive. Mold growth often occurs and becomes particularly troublesome when excessive moisture or water accumulates and remains undiscovered or un-addressed for long periods of time.

There are several health effects and symptoms associated with mold exposure. Some health effects and symptoms include allergic reaction, asthma, eye irritation, nasal stuffiness, wheezing, and skin irritation. More severe reactions are often indicated with people who have serious allergies to mold, people with chronic lung illnesses, and workers who are exposed to large amounts of mold in occupational settings. These severe reactions may include fever, shortness of breath, cancer, and mold infections in the lungs.

Because of these health effects, mold removal is necessary whenever mold is present. Removal of mold, however, has become a major concern. When mold is removed using currently available methods, the persons removing the mold are exposed to severe health risks. During cleaning and removal, mold spores will likely be stirred and become airborne. Further, the more the structure is disrupted or broken apart, the higher the propensity for dusting, a primary means of transportation for mold spores. Persons near these airborne spores are more susceptible and at an increased risk of inhaling these dislodged particles; therefore, before clean up and mold removal is begun, it is critical that measures be taken to minimize dust and prevent the mold spores from spreading to other areas of the house or building. To minimize the particulate matter and prevent spreading of the mold spores, the area being cleaned must be properly contained prior to removal.

Current methods to remediate such mold problems may be expensive and structurally intrusive. In some cases, it may be necessary to remove and replace materials that have been sufficiently invaded with the mold. There have been many reports of techniques for the removal of mold. Common techniques include utilizing a form of sanding, scraping, or dry ice blasting the mold away. These techniques are extremely difficult and costly to implement but have been a method of choice for many applications. Further, these techniques often cause the mold to become airborne and therefore, are hazardous to the persons in the area and do not guarantee complete mold removal unless the area is fully contained prior to removal. Other techniques have been discussed wherein chemicals are applied to the mold for removal or containment. These techniques, however, are also lacking. Bleaches are often used to contain or kill mold, such as those found in U.S. Pat. No. 5,783,550; however, bleach does not remove the mold and a discoloration usually appears on the mildewed surface treated with the bleach. Acids are also frequently used with bleaches to kill and remove the mold. While acids may be used, such as those discussed in U.S. Pat. No. 4,097,395 which enable the remover to dissolve and remove the mold to produce a visibly clean surface, an irritating odor is often created. Further, the difficulty of utilizing strong acid solutions and bleaches in a closed environment would be readily realized to one of skill in the art. It would especially be apparent that the strong acid necessary to kill and remove mold from a large area would create an additional hazard to persons in the area and require a substantial volume of hazardous solvent. Mold inhibitors with anti-fungal or anti-microbial agents integrated within a matrix, such as those found in U.S. Pat. No. 6,939,937, are also used upon targeted area which require either remediation or prevention of growth of fungus or microbes.

Similar to the removal of mold particulate matter, the removal and presence of asbestos particulate matter in an area can also create extremely hazardous conditions. For many years asbestos was a material of choice within the building industry as a sound and thermal insulator. The properties of asbestos are well documented and further elaboration is not necessary herein. One problem with asbestos is the propensity for dislodged particulate matter to become airborne wherein it becomes susceptible to being inhaled by occupants of the building. After many years it was determined that the inhaled particles can be detrimental to ones health and, in fact, the disease created by inhalation of asbestos is now commonly referred to as asbestosis. Unfortunately, by the time the hazards of asbestos were discovered, it was the predominant material in such diverse applications as pipe wrap, flooring material, wall material, and bulk insulation just to name a few.

Safety procedures to protect people working in areas containing asbestos are known in the art. For example, procedures exist for drilling small holes into plaster wall containing asbestos. One such method includes the use of a drill with a vacuum attachment and a baffle attachment. Shaving cream is sprayed over the drilling area and the baffle is fitted over the shaving cream to control the release of asbestos fibers into the air during drilling. While this method is sufficient for drilling small holes, it is insufficient for drilling in or removal of asbestos areas larger than the size of a baffle. Further, workers are required to wear respirators and protective clothing at all times during the drilling. Because the mere presence of asbestos particulate matter is a hazard and working in asbestos containing areas is difficult, easier and safer solutions for dealing with asbestos have been contemplated.

Those of skill in the art are left with two solutions for dealing with asbestos neither of which is totally satisfactory. One solution is to contain the particles and the other is to remove the asbestos or asbestos containing material. There are many teachings related to permanent sealants for asbestos containing materials. These clearly are advantageous when the asbestos is to be left in place. Removing the asbestos has proven to be a substantial problem since virtually any removal process involves abrading the asbestos thereby increasing the rate at which particles are dislodged. The more the structure is disrupted, or broken apart, the higher the propensity for dusting. Even sealed asbestos is eventually removed; therefore, the removal process occurs for virtually all asbestos containing products.

There have been many reports of techniques for the safe removal of asbestos. These can be broadly characterized as mechanical techniques and chemical techniques. Mechanical techniques utilize some form of area containment in combination with a pressure differential or flowing medium to either contain the particles or entrain them in the stream of flowing medium. These techniques are extremely difficult and costly to implement but have been the method of choice for most applications.

Chemical techniques have been discussed wherein the asbestos is either chemically modified or coated prior to removal. These techniques are also lacking. Acids, and particularly fluorides, are known to convert asbestos to a non-asbestos material. Chemical modification of the asbestos has been exploited in various forms as illustrated in U.S. Pat. Nos. 6,589,156; 5,743,841; 5,516,973 and 5,439,322. The difficulty of utilizing strong acid solutions in a closed environment would be readily realized to one of skill in the art. It would especially be apparent that a stoichiometric volume of a strong acid necessary to remove asbestos from a large area would create an additional hazard and require a substantial volume of solvent.

Various efforts have been reported for coating the asbestos prior to removal. U.S. Pat. No. 4,857,085 teaches vaporization of cyanoacrylate to form a hard film on the asbestos prior to dismantling the asbestos. This technique is adequate for encapsulating the visible surface of the asbestos, but it is not sufficient to cover areas which break during removal. Therefore, a hard film is inadequate to solve the problems associated with airborne particles.

U.S. Pat. No. 4,693,755 describes formation of a cellulosic polymer which is applied to the asbestos. The cellulosic polymer is allowed to penetrate, and the asbestos is removed while still wet. This technique has an advantage in that the polymer is somewhat mobile but it is still inferior for covering newly exposed areas of the asbestos. Furthermore, the problems associated with large volumes of solvent remain.

In summary, the art has been seeking a method for safe complete removal of particulate matter which does not require large volumes of solvent, adequately protects surfaces as they become exposed, prevents persons from inhaling the airborne particles, and which is economical.

SUMMARY OF THE INVENTION

It is an object of the present invention to provide a system for removal of particulate matter which may become airborne.

It is an object of the present invention to provide a system for removal of particulate matter which may become airborne such as mold spores and asbestos particles.

It is another object of the present invention to provide a system for removal of particulate matter which adequately covers newly exposed particulate matter resulting from a removal process.

Yet another object of the present invention is to provide a system for removal of particulate matter which eliminates solvents thereby substantially reducing the total volume of material which must be cleaned after removal of the particulate matter.

A particular feature of the present invention is the ability to utilize materials which are safe to handle, readily available, easily dispensed and economical.

These and other advantages, as will be realized, are provided in an improved process for removal of particulate matter. The process includes applying a foam to the particulate matter. The particulate matter is then removed, prior to the foam draining, and encased in a storage device.

Yet another embodiment is provided in a process for removal of particulate matter from a support structure. The process includes applying a non-reactive foam to the particulate matter and separating the particulate matter from the support structure prior to the foam draining.

Yet another embodiment is provided in a process for removal of particulate matter from a support structure. The process includes applying a foam to the particulate matter wherein the foam has a pH of 5 to 9. The particulate matter is separated from the support structure, prior to the foam draining, and encased in a storage device.

BRIEF DESCRIPTION OF THE FIGURES

FIG. 2 illustrates the separation of a subsection from a surface.

FIG. 3 illustrates the partial removal of a subsection area from a larger area.

FIG. 4 illustrates a removed subsection area and remaining larger area.

DETAILED DESCRIPTION OF THE INVENTION

Figure 1:
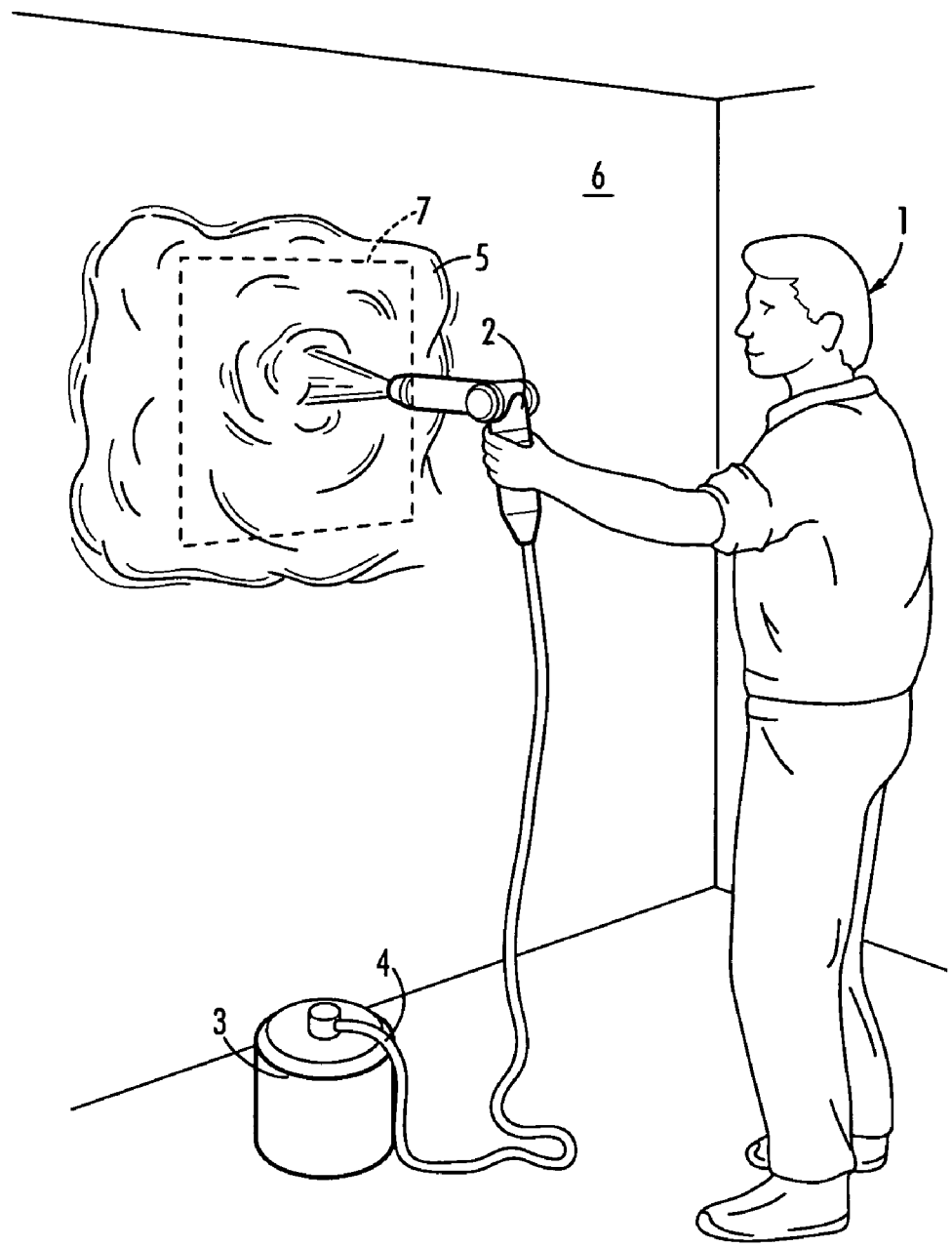
FIG. 1 illustrates the application of foam to a surface.

The present invention is specific to the use of foam which is applied to particulate matter for removal. When particulate matter or material containing particulate matter, such as mold infested materials or asbestos, is to be removed, the foam is applied to the particulate matter area to prevent it from becoming airborne during removal. As the particulate matter area is subsectioned or new areas of particulate matter are exposed during removal, the foam easily conforms and migrates to newly exposed surfaces. The foam also has the advantage of covering a large area with a minimal amount of material. Neither a baffle attachment nor a vacuum is necessary to prevent the particulate matter from becoming airborne. Further, because the excursion and exposure levels are nearly zero, the persons removing the particulate matter are not required to wear respirators or protective clothing.

Particulate matter includes small discrete masses of solid or liquid matter which may become airborne. Examples of particulate matter include mold spores and asbestos particles. Other types of particulate matter exist and are considered part of the present invention without departing from the spirit and scope of the present invention. In many instances, particulate matter poses health risk because it may be inhaled and become lodged in a person's nose, eyes, throat, or lungs when it becomes airborne. Further, different types of particulate matter maintain varying health effects on humans and therefore require quick and safe removal.

The invention will be described with reference to the figures forming an integral non-limiting part of the instant disclosure.

For the purposes of the present invention, foam is defined as a non-reactive dispersion of a gas or vapor in a liquid. When removing a particulate matter area, the drain time, or time required for the foam to decompose into the original liquid and gas phases, should be sufficiently long to allow for the particulate matter area to be removed and transported to a contained environment without substantial loss of foam.

A foam production system typically includes a foam precursor, or pre-foamed liquid, an expansion gas and equipment capable of combining, mixing, and discharging the foam.

The foam precursor is preferably a liquid with a surface tension sufficiently low to form a foam. The surface tension is preferably below about 30 dynes/cm and can be lowered by incorporation of suitable surfactants. Water based systems are suitable but organic based foams are most preferred. The foam preferably has a near neutral pH of around 5-9 and more preferably around 6-8. The foam is preferably thixotropic with a viscosity that is shear dependent. In the absence of shear force, the foam will not flow and can be stacked or piled to depth if desired. It is most preferred that the foam precursor be substantially non-reactive with the particulate matter. While not limited thereto, a particularly preferred foam is BilMar Foam, product code 12-530 available from IPC Supply, Inc. of Anderson, S.C.

The expansion gas can be air, however, other expansion gas systems are known to be useful such as low molecular weight hydrocarbons, nitric oxide or carbon dioxide. Air is preferred due to the low cost, low toxicity, and the fact that a separate tank is not necessary. It is most important that the expansion gas be non-soluble in the foam precursor.

The foam precursor may have adjuvants as known in the art including surfactants such as sodium lauryl sulfate; stick or adhesive additives such as styrene-butadiene polymer; thickeners or viscosity modifiers such as typical paint thickeners, gelatin or modified starches; and others.

Foam generating equipment is well documented and not particularly limiting herein. The foam generating equipment has two main components. One component combines the liquid foam precursor with the expansion gas. The mixing is preferably very thorough to insure the drain time is sufficiently long and that the expansion is optimum. The mixing can be done by passing through a hose, or pipe, with sufficient flow turbulance to mix the components. Alternatively, the mixture can be passed through a mixing device such as a packed bed mixture.

During use, if a large area of particulate matter or material containing particulate matter requires removal, the particulate matter area to be removed is covered with foam. A subsection of the particulate matter area is then typically separated from the larger section by cutting or otherwise breaking the particulate matter area into subsections within the boundary of the foam covering. Alternatively, the particulate matter area is separated from a support structure. The present invention does not contemplate drilling small holes into the particulate matter area. One advantage of the foam is that the cutting can occur through the foam and as the cutting element is withdrawn, the foam heals thereby maintaining a continuous coating. As the subsection is withdrawn, the foam begins to elongate, and, as the foam breaks, the foam naturally collapses to cover both exposed edges from the cutting operation. This ability to stretch, heal and collapse over the newly formed edges provides a benefit not available from prior art techniques. As would be realized, the particulate matter area is removed prior to the foam draining.

After the particulate matter area is removed, it is preferable to encase the particulate matter area in a storage device, such as sealed plastic, to avoid particles becoming airborne during transport and delivery. It would be readily apparent that it is most preferable to encase the removed particulate matter area prior to the foam draining.

As discussed above, the foam can easily cover a large area with a minimal amount of material. Further, a baffle attachment for covering the foam to prevent the particulate matter from becoming airborne is not necessary. A vacuum is also not necessary in the area because the foam fully prevents the particulate matter from becoming airborne. Because the excursion and exposure levels are nearly zero using the present invention, the persons removing the particulate matter are not required to wear respirators or protective clothing.

An example of the process of particulate matter removal will be described with reference to the figures. In the various figures, similar elements are numbered accordingly.

Application of the foam is illustrated in FIG. 1. In FIG. 1, a user, 1, activates a nozzle, 2, which receives foam precursor and expansion gas from a foam generator, 3, via a hose, 4. The foam, 5, is applied to a surface, 6. If the entire surface is to be removed intact, foam is applied to the edges of the surface as would be realized from the disclosure herein. It is most common to remove a subsection, 7, of the surface, 6, by cutting or otherwise forming a separation between the surface and the subsection. A rotary tool, 8, is particularly suitable for cutting the subsection from the surface as illustrated in FIG. 2. As the rotary tool enters and is withdrawn, the foam extends and then collapses and heals providing a near continuous seal before, during, and after the cutting operation.

A subsection partially removed from the surface is illustrated in FIG. 3. As the subsection is removed, the foam, 5, elongates and, due to the thixotropic properties, eventually collapses thereby covering the edge of the subsection, 9, and the edge of the surface, 10, illustrated in FIG. 4. The user would then continue to apply foam to a second subsection for separation from the surface.

Those skilled in the art will realize that the foam may be applied to any particulate matter containing surface or area, including support structures such as the wall, the floor, and the ceiling. If the particulate matter is being removed from the floor, a particularly preferred embodiment of the process includes the use of a shovel type device. After the foam is applied to the removal area, the shovel type device is used to breakup the particulate matter containing material. As the particulate matter containing material is broken up, the foam elongates and collapses to cover the newly exposed portion of the material. The shovel type device may also be used to collect and transport the particulate matter containing material into a storage device for disposal.

The invention has been described with particular emphasis on the preferred embodiments without limit thereto. Based on the foregoing description, other embodiments and alterations would be apparent without departing from the scope of the invention which is more specifically set forth in the claims appended hereto.

The invention claimed is:

1. A process for removing asbestos from a building structure, said building structure having floors, walls and ceilings with asbestos contained therein, comprising the steps of:

applying foam to a portion of said building structure having asbestos therein to thoroughly isolate said asbestos in said portion with said foam said foam being chemically non-reactive with said asbestos;

removing said asbestos from said portion of said building structure while said foam remains flowable and maintains isolation of said asbestos;

moving said foam-isolated asbestos which has been removed toward a container while maintaining isolation of said asbestos only by the presence of said foam on said asbestos;

placing said foam-isolated asbestos which has been removed into a container; and sealing said container so as to continue isolation of said foam-isolated asbestos, wherein neither a baffle nor a vacuum is necessary to prevent said asbestos from becoming airborne during removal.

2. The process of removing asbestos of claim 1 wherein said foam has a pH of at least 5 to no more than 9.

3. The process of removing asbestos of claim 1 wherein said foam is thixotropic.

* * * * *